P. R. NESTLER
PROCESS OF KNITTING GARTER EXTENSIONS FOR HOSIERY
Dec. 8, 1931.
Original Filed May 8, 1930
Re. 18,279
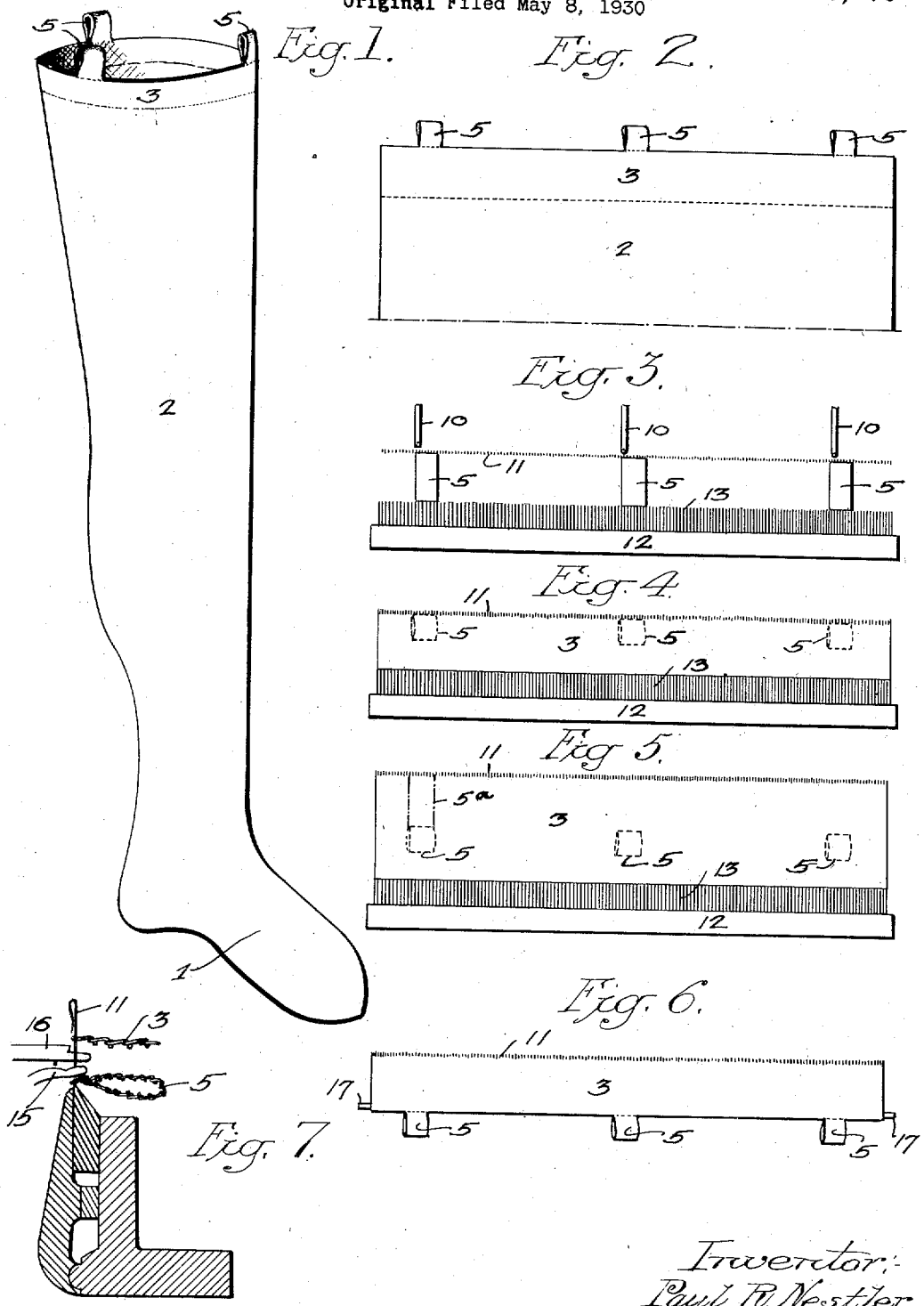
Inventor:
Paul R. Nestler,
by his Attorneys
Howson & Howson Reissued Dec. 8, 1931 Re. 18,279

UNITED STATES PATENT OFFICE

PAUL R. NESTLER, OF GREEN LANE, PENNSYLVANIA, ASSIGNOR OF ONE-HALF TO EARL L. KOTZEN, OF READING, PENNSYLVANIA

PROCESS OF KNITTING GARTER EXTENSIONS FOR HOSIERY

Original No. 1,806,492, dated May 19, 1931, Serial No. 450,854, filed May 8, 1930. Application for reissue filed August 6, 1931. Serial No. 555,589.

This invention relates to a stocking having garter attachment tabs extending above the top of the welt of the stocking, and formed as integral parts of the stocking. The invention also relates to a method by which the tabs are interknit with the stocking.

The object of the invention is to form a number of garter attachment tabs at predetermined spaced intervals around the stocking top, to definitely establish the points at which the garter grips are to be attached to the stocking, thereby permitting the welt of the stocking to be made narrower than heretofore, with a consequent saving of time and material, which, when silk is employed, results in a substantial monetary saving to the manufacturer.

Heretofore full fashioned stockings have been made with turned welts ranging from four to six inches in width, in order to insure that the garter grips would at no time be applied to the single ply fabric of which the leg of the stocking, below the welt, is composed. By providing tabs which extend above the welt of the stocking, and thereby establishing definite points for the reception of the garter grips, the welt may be reduced to one inch or less in width, as desired.

By interknitting the tabs with the stocking as integral parts thereof, in accordance with the method hereinafter disclosd, the line of juncture between the tabs and the welt becomes an anti-runner line, which will prevent any runs that may start in the tabs, by reason of the garter grips chafing the thread thereof, from passing down into the welt or to the leg of the stocking.

Referring to the accompanying drawings:

Fig. 1 is a perspective view of a stocking equipped with tabs according to the principles of my invention;

Fig. 2 is a view of the upper part of a flat knit stocking blank, showing the tabs interknit therewith;

Fig. 3 illustrates diagrammatically the knitting of the tabs, independent of the stocking;

Fig. 4 illustrates diagrammatically the interknitting of the tabs with the welt of the stocking;

Fig. 5 illustrates diagrammatically the welt prior to the turning thereof;

Fig. 6 illustrates diagrammatically the welt after turning, with the tabs interknit with and at the turning line or top of the welt; and Fig. 7 is a sectional view of a portion of the machine showing the position of the preknit tabs on the needles during the knitting of the first half of the welt.

In Fig. 1, I have illustrated a stocking comprising the usual foot portion 1, and leg portion 2 having a turned welt 3, above which projects a plurality of garter attachment tabs 5, spaced at predetermined intervals around the top of the stocking.

In producing the stocking according to the principles of my invention, I first employ a number of thread guides 10, 10, in the present instance three in number.

Each thread guide 10 is arranged to traverse a predetermined number of needles 11, for example twenty, at predetermined spaced intervals across the width of the total number of needles to be employed subsequently in the knitting of the welt of the stocking.

I then insert the usual welt bar 12 having hooks 13 upon which the first course of stitches of each tab unit is produced. The machine is then started and run in the usual manner until a predetermined number of courses of stitches have been knitted, simultaneously, as the three independent thread guides traverse their respective sets of tab knitting needles, the take-up of the knitting machine drawing the welt bar outwardly in the usual manner to take off the successively knit courses of stitches.

After a predetermined number of courses have been knit in the series of tabs simultaneously, the welt bar is released from the take-up mechanism and the stitches held by the hooks of the welt bar are transferred back onto the needles on which the last course of tab stitches is still hanging, in the same manner as employed in turning a welt, thus producing the tabs 5, which are thereby composed of two ply of knitted fabric.

The folded tabs 5, thus produced, are then pressed down on the needles to a point below the knocking-over bits 15, see Fig. 7. The welt bar 12 is again inserted with the hooks 13 thereof in position, relative to the needles 11, to begin the knitting of the welt in the usual manner.

In the knitting of the welt fabric 3, but one thread guide is used, as usual; this may be one of the guides used in the knitting of the tabs 5, or it may be an independent guide carrying a different thread, as desired.

When a number of welt courses corresponding to the desired width of the turned welt have been produced the folded tabs 5, 5 are raised to a point above the sinkers 16, substantially in contact with the underside of the knitted welt fabric 3, as illustrated in Fig. 4.

The knitting of the second half of the welt is then carried on in the usual manner producing the strip of welt fabric 3 shown in Fig. 5, with the tabs 5, 5 interknit therewith and hanging from the underside of the fabric at the turning point of the welt, as illustrated in said figure.

The welt 3 is then turned in the usual manner, a welt rod 17 being inserted in the turned welt 3, as shown in Fig. 6. The take-up is then attached and the knitting of the leg 2 progresses in the usual manner.

By forming the tabs 5 first, as independent units, lowering them to a point on the needles below the knocking-over bits 15 and subsequently raising them to the knitting point above the sinkers to be interknit with the welt fabric 3, the line of juncture between the tabs 5 and the welt fabric 3 becomes an anti-runner line, because of the wales of the tabs being independent of the welt wales to which they are attached, and if desired the three thread guides 10 may be again brought into action during the knitting of the second half of the welt fabric to knit the tabs down into the one ply of the welt fabric, as illustrated at 5*a* in Fig. 5, to reinforce the portion of the welt to which the tabs are directly attached.

While I have described my invention as being applied to a flat knit stocking, obviously the principles disclosed are applicable to circular knit hosiery with equal effectiveness, and while I have shown three tabs obviously any desired number or any desired relative positioning of the tabs may be resorted to without departing from the essential features of the invention.

I claim:

1. A method of forming garter tabs on the top of a stocking as integral parts of the stocking which consists of producing a plurality of independent strips of fabric on relatively spaced sets of needles of a knitting machine, transferring the first knit course of stitches of each independent strip back onto the said needles, moving the folded tabs thus produced into non-knitting positions on the needles, subsequently knitting a portion of the welt of the stocking on a full complement of needles including said spaced sets thereof, then moving the folded tabs back into knitting position on the needles, and completing the knitting of the stocking welt on said full complement of needles to effect interknitting of the tabs therewith.

2. The method of forming an appendage on the welt of a stocking which consists of producing a predetermined number of courses of stitches on the needles of a knitting machine, transferring the first knit course back onto the needles, moving the folded fabric thus produced into a non-knitting position on the needles, subsequently knitting a portion of the welt of the stocking on the needles, then moving the said folded fabric back into knitting position on the needles, continuing the knitting of the welt of the stocking to interknit the folded fabric therewith, transferring the first knit course of stitches of the welt fabric back onto the needles to form a turned welt on the stocking and then continuing the knitting of the stocking.

3. The method of forming an appendage on the top edge of the welt of a stocking which consists of producing a predetermined number of courses of stitches on the needles of a knitting machine, transferring the first knit course back onto the needles, moving the folded fabric thus produced to a non-knitting position on the needles, subsequently knitting on the needles a predetermined number of courses of stitches approximating the depth of the welt, moving the said folded fabric back into knitting position on the needles, then continuing the knitting of the welt fabric to the extent of a number of courses of stitches approximating the depth of the welt to interknit the said folded fabric with the welt, then transferring the primary course of stitches of the welt fabric onto the needles and continuing the knitting of the stocking fabric, whereby the appendage formed by the said folded fabric will be disposed at the turning line of the welt.

PAUL R. NESTLER.